G. TUCK & A. E. KENNEDY.
EDUCATIONAL DEVICE.
APPLICATION FILED MAR. 16, 1909.
969,309.
Patented Sept. 6, 1910.
Fig. 1.    Fig. 2.   Fig. 4.    Fig. 3.    Fig. 8.
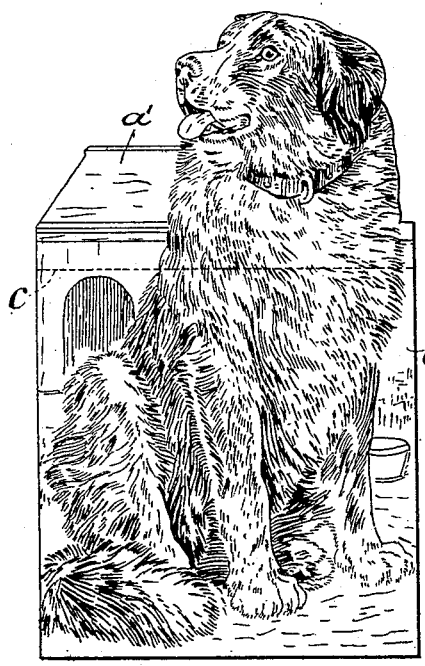
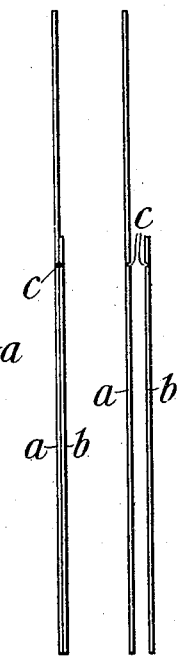
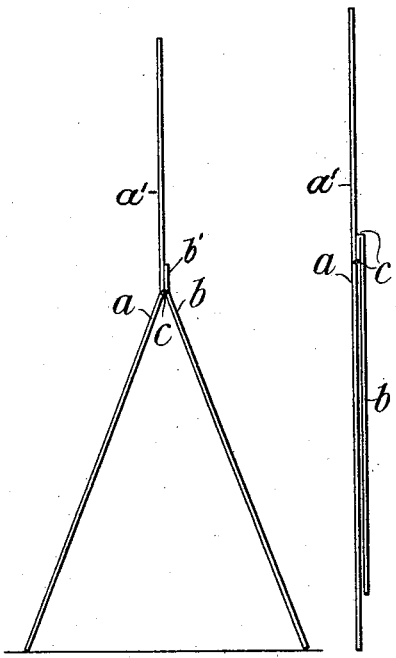
Fig. 5.    Fig. 6.    Fig. 7.
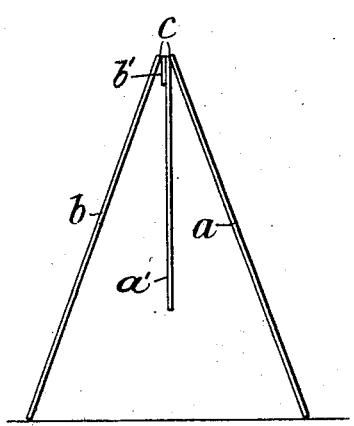
Witnesses:
Caroline Osborn.
Frank A. Peters.
Inventors:
Gustave Tuck and
Albert Ernest Kennedy
by Arthur S. Browne
their attorney

UNITED STATES PATENT OFFICE.

GUSTAVE TUCK, OF LONDON, AND ALBERT ERNEST KENNEDY, OF LEYTON, ENGLAND.

EDUCATIONAL DEVICE.

969,309. Specification of Letters Patent. Patented Sept. 6, 1910.

Application filed March 16, 1909. Serial No. 483,720.

*To all whom it may concern:*

Be it known that we, GUSTAVE TUCK, of the firm of Raphael Tuck and Sons Limited, a subject of the King of Great Britain, resident of Raphael House, Moorfields, in the city of London and Kingdom of Great Britain, and ALBERT ERNEST KENNEDY, a subject of the King of Great Britain, resident of 4 Abbott's Park road, Leyton, in the county of Essex and Kingdom of Great Britain, have invented new and useful Improvements in Educational Devices, of which the following is a specification.

This invention relates to devices to be used in teaching the alphabet or imparting other information and in which such information is associated with pictures or illustrations.

According to the invention the letters of the alphabet or other information and the pictures or illustrations are depicted on leaves or pieces of cardboard or the like hinged together in such a manner that when folded together in one direction a letter or other information only is visible the picture or illustration being concealed and when folded in the opposite direction the picture or illustration is rendered visible and the letter or other information concealed.

A suitable arrangement for carrying out the invention is as follows:—The leaf or piece of cardboard or the like having the picture or illustration thereon is made of larger size than the leaf or piece having the letter or other information imprinted thereon and both pieces are scored across near the top, the portion of each piece above the scoring cut being cemented together with the said cuts adjacent. Or one of the leaves may have its upper part folded down at the scoring cut before being cemented to the upper part of the other leaf. By opening out the leaves of the device whether the letter or other information or picture be in view the said device can be supported in an upright position on a table or other surface. Where letters of the alphabet are used, the space at the back of either or both leaves may be imprinted with information relative to the picture or illustration.

In order that the invention can be clearly understood reference is had to the annexed drawing, in which, Figure 1 is an elevation of the improved device with the leaf in view on which is imprinted the picture or illustration and Fig. 2 is a side view thereof. Fig. 3 is also a side view of the device but with the leaves opened out to enable it to be supported in an upright position. Fig. 4 is a side view of the leaves detached from each other. Fig. 5 is an elevation of the device after the leaves are folded so as to expose to view the surfaces opposite to those exposed in Figs. 1, 2 and 3. Fig. 6 is a side view thereof and Fig. 7 is a similar view to Fig. 6 but showing the leaves opened similarly to Fig. 3. Fig. 8 is a view similar to Fig. 2 illustrating a slight modification.

$a$ is the leaf or piece of cardboard or the like having the picture or illustration thereon and $b$ is the leaf or piece of similar material provided with a letter of the alphabet, the piece $a$ being of larger dimensions than the piece $b$.

$c, c$, are the scoring cuts made across both pieces near the top, as shown clearly in Fig. 4, the two portions $a^1$, and $b^1$, of the pieces $a$ and $b$ respectively above the cuts being afterward cemented together as indicated in Fig. 2, the picture or illustration and the letter facing in the same direction. When the leaves $a$ and $b$ are in the position shown in Figs. 1 and 2 the picture or illustration is visible, the upper part $a^1$ of the leaf $a$ constituting an extension which extends above the hinge formed by the cuts $c, c$, but when the leaves are opened out from this position so as to fold in the opposite direction they assume the position shown in Fig. 6 thereby rendering the letter of the alphabet visible as shown in Fig. 5 and concealing the picture or illustration. By opening out the leaves $a$ and $b$ from the position shown in Figs. 2 and 6 they may be caused to assume the positions shown in Figs. 3 and 7 respectively so that the device can be supported in an upright position on a table or the like with the illustration or the letter in view.

Instead of the leaves being cemented together with their upper portions in the positions shown in Fig. 4 the leaf $b$ may have its upper part $b^1$ folded down at the scoring cut before being cemented to the extension $a^1$ of the leaf $a$ as shown in Fig. 8.

Information relative to the picture or illustration may be imprinted at the back of either or both leaves, and in some cases the letter of the alphabet may be omitted and such information imprinted in its place.

The extension $a^1$ carries a part of the picture and also serves to hide the connection between the leaves $a$ and $b$.

We claim:—

An educational device comprising two leaves or pieces of cardboard, one having a letter of the alphabet or other information thereon and the other a picture or illustration and both hinged together near the top with the letter or other information and the picture facing in the same direction one leaf being provided with an extension which extends above the hinging point when folded in one direction, substantially as described.

GUSTAVE TUCK.
ALBERT ERNEST KENNEDY.

Witnesses:
H. D. JAMESON,
F. L. RAND.